United States Patent Office 3,228,911
Patented Jan. 11, 1966

3,228,911
CASTING, ADHESIVE AND COATING COMPOSITIONS COMPRISING EPOXY RESINS AND AMINOHYDROXYALKYL AMINES
Edgar R. Rogier, Hopkins, Minn., assignor to General Mills, Inc., a corporation of Delaware
No Drawing. Filed Dec. 14, 1961, Ser. No. 159,421
4 Claims. (Cl. 260—47)

This invention relates to compositions which cure at room temperatures to form tough, insoluble, infusible resinous materials useful as adhesives, surface coatings, and castings. More particularly, it relates to compositions comprising epoxy resins and certain aminohydroxyalkyl amines.

It has been known heretofore that epoxy resins can be cross-linked with ordinary aliphatic amine curing agents to form infusible, resinous materials. However, the reactions are so fast that the materials do not have a pot life long enough for practical use. Also, the cured compositions are brittle and thus lack the impact resistance required for many coating applications. The compositions in accordance with this invention have much greater utility in that the pot life of the mixtures (the length of time during which the mixture can be used or applied after the mixture is formed) is much longer than compositions containing ordinary aliphatic amine curing agents. Also, my compositions have very high impact resistances and thus are particularly suitable for many coating applications.

It is among the objects of the present invention, therefore, to provide a composition as an adhesive, casting composition, potting compound, and the like containing an epoxy resin and an aminohydroxyalkyl amine curing agent.

A further object is to provide a composition which is curable at room temperature and possesses a practical pot life.

Another object of the invention is to provide compositions which cure to a hard, tough, infusible resin which are new and useful.

It has now been discovered that these and other objects of the invention may be accomplished by reacting an epoxy resin with certain aminohydroxyalkyl amines. The resinous compositions so prepared are particularly useful as adhesives, coatings, and castings.

The aminohydroxyalkyl amine curing agents of the present invention may be represented by the formula:

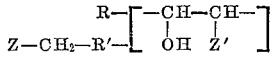

where R is hydrogen or an aliphatic hydrocarbon group of 1 to 20 carbons and R' is a divalent aliphatic hydrocarbon group of 1 to 20 carbon atoms. R and R' are preferably aliphatic hydrocarbon groups of 5 to 17 carbon atoms and the total number of carbon atoms in R and R' is in the range of 5 to 21, preferably 9 to 17. Z and Z' are selected from the group consisting of

and

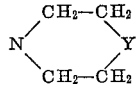

where R" and R''' are members selected from the class consisting of (1) hydrogen, (2) aliphatic groups, (3) aryl groups, (4) hydroxyalkyl groups, and (5) aminoalkyl groups and Y is O, N or S. R" and R''' are preferably hydrogen, aliphatic groups or aminoalkyl groups. Z and Z' may be the same or different. The above formula represents two groups of isomeric compounds which may be illustrated by the formulae:

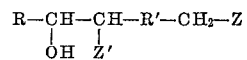

and

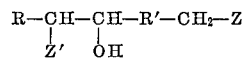

where R, R', Z', and Z are as defined above. Hereinafter, the description will be restricted to one isomeric form; however, it will be understood that the description applies equally to both isomers.

The curing agents of the present invention may be prepared by hydrogenation of the corresponding aminohydroxy nitriles which in turn may be obtained by the reaction of an epoxy higher alkyl nitrile with ammonia or a primary or secondary amine to introduce a hydroxyl group on one of the epoxy carbon atoms and an amino group on the other.

The epoxy higher alkyl nitriles which are to be used in preparing the aminohydroxyalkyl nitriles are those epoxy nitriles which may conveniently be obtained by the reaction of perbenzoic or peracetic acid with an unsaturated fatty nitrile.

The unsaturated fatty nitriles may be prepared by reacting ammonia and an unsaturated higher fatty acid, such as oleic, erucic, eleostearic, linoleic, linolenic, clupanodonic, palmitoleic, and palmitolenic acids, forming thereby unsaturated fatty nitriles having an even number of carbon atoms. Since natural higher fatty acids having an odd number of carbon atoms are rare, unsaturated fatty nitriles having an odd number of carbon atoms are preferably prepared by the reaction of an unsaturated alkyl halide and an inorganic cyanide. The unsaturated higher fatty acids, supra, occur naturally in animal and vegetable fats and oils. The unsaturated alkyl halides may be prepared by converting an unsaturated fatty acid to an alcohol and subsequently reacting the alcohol with a halogen acid to form the unsaturated alkyl halide.

It will be readily apparent to those skilled in the art that a large number of aminohydroxyalkyl nitriles may be prepared by reacting one of the previously described epoxy nitriles with ammonia or a primary or secondary amine. Such compounds as ethylene diamine, diethylene triamine, or other polyamines, morpholines, ethanolamine, diethanolamine, amino phenols, substituted and unsubstituted alkyl and aryl amines are only representative of the many varieties of amine reactants which may be used to split the epoxy group to form the aminohydroxy nitriles which will, upon hydrogenation, yield the curing agents of the present invention.

Illustrated below is a typical preparation of a 9-amino-10-hydroxystearylamine from oleic acid:

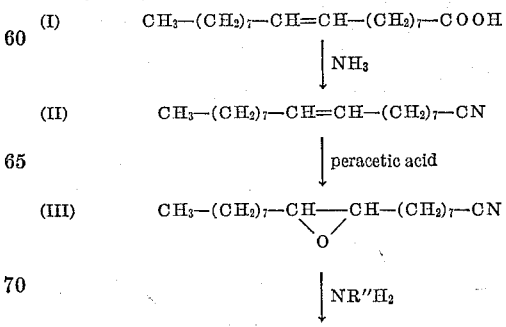

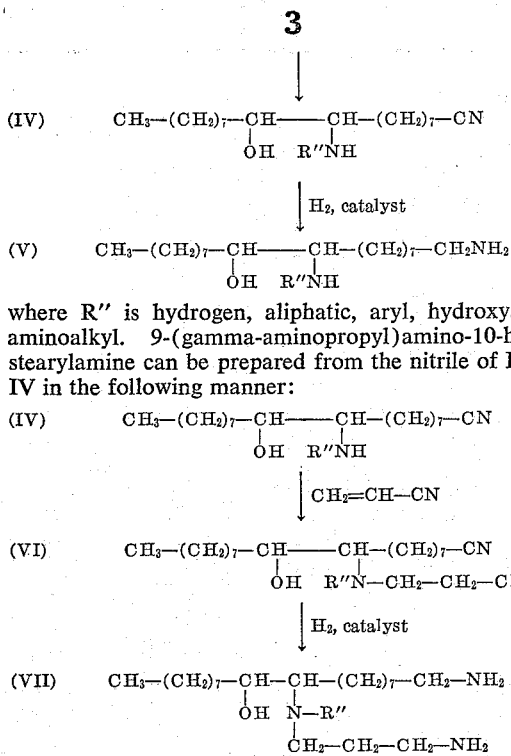

where R″ is hydrogen, aliphatic, aryl, hydroxyalkyl or aminoalkyl. 9-(gamma-aminopropyl)amino-10-hydroxystearylamine can be prepared from the nitrile of Formula IV in the following manner:

where R″ has the meaning set forth above.

The final step in obtaining the curing agents of the present invention, as illustrated above, is the hydrogenation of the nitrile group or groups to form the aminohydroxyalkyl amines. Generally, any of the methods of the prior art used to hydrogenate nitriles to amines are suitable. A particularly satisfactory method utilizes Raney nickel and hydrogen at a moderate temperature (50–150° C.) and pressure (50–1500 p.s.i.g.).

As stated hereinbefore, the preparation of the curing agents of the present invention by the method illustrated above will produce a mixture of two isomers since the epoxy ring may be split at either carbon to oxygen bond. In the reaction scheme shown above, the two isomers would be formed:

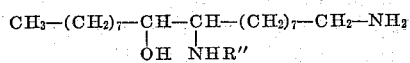

and

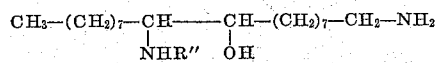

where R″ is as previously described. These groups of compounds are the 9-amino-10-hydroxystearylamines and 10-amino-9-hydroxystearylamines, respectively. Isomers of this type are conveniently referred to by an alternative nomenclature, e.g. 9(10)-amino-10(9)-hydroxystearylamines.

The aminohydroxyalkyl amine curing agents and the preparation thereof are further described in my co-pending applications, Serial No. 852,937 (now Patent No. 3,123,604) and Serial No. 77,295 (now Patent No. 3,169,991), filed November 16, 1959, and December 21, 1960, respectively, of which the present application is a continuation-in-part.

Both solid and liquid epoxide resins can be cured with the aminohydroxyalkyl amine curing agents. In general, the most commonly available epoxy resins are those which are the reaction products of epichlorohydrin and bis(p-hydroxyphenyl)propane, "Bisphenol A." Such resins have the following theoretical structural formula:

where $n$ is 0 or an integer up to 10. Generally speaking, $n$ will be no greater than 2 or 3, and is preferably 1 or less. However, other types of epoxy resins may be employed.

Another of such epoxy resins is that which is the reaction product of epichlorohydrin and bis(p-hydroxyphenyl)sulfone. Still another group of epoxy compounds which may be employed is the glycidyl esters of the polymeric fat acids. These glycidyl esters are obtained by reacting the polymeric fat acids with polyfunctional halohydrins such as epichlorohydrins. In addition, the glycidyl esters are also commercially available epoxide materials. As the polymeric fat acids are composed largely of dimeric acids, the glycidyl esters thereof may be represented by the following theoretical idealized formula:

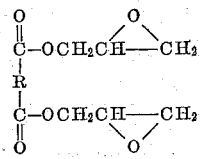

where R is the divalent hydrocarbon radical of dimerized unsaturated fatty acids.

The polymeric fat acids are well-known materials, commercially available, which are the products prepared from the polymerization of unsaturated fatty acids to provide a mixture of dibasic and higher polymeric fat acids. The polymeric fat acids are those resulting from the polymerization of the drying or semi-drying oils or the free acids or the simple aliphatic alcohol esters of such acids. Suitable drying or semi-drying oils include soybean, linseed, tung, perilla, oiticia, cottonseed, corn, sunflower, safflower, dehydrated castor oil, and the like. The term "polymeric fat acids," as used herein and as understood in the art, is intended to include the polymerized mixture of acids which usually contain a predominant portion of dimer acids, a small quantity of trimer and higher polymeric fat acids, and some residual monomers.

In general, the most readily available naturally occurring polyunsaturated acid available in large quantities is linoleic acid. Accordingly, it should be appreciated that polymeric fat acids will, as a practical matter, result from fatty acid mixtures that contain a preponderance of linoleic acid and will thus generally be composed largely of dimerized linoleic acid. However, polymerized fatty acids may be prepared from the naturally occurring fatty acids having from 8 to 22 carbon atoms. Illustrative thereof are oleic, linolenic, palmitoleic, and the like.

Other types of epoxy resins which may be cured with the aminohydroxyalkyl amines and which are commercially available epoxy materials are the polyglycidyl ethers of tetraphenols which have two hydroxy aryl groups at each end of an aliphatic hydrocarbon chain. These polyglycidyl ethers are obtained by reacting the tetraphenols with polyfunctional halohydrins such as epichlorohydrin. The tetraphenols used in preparing the polyglycidyl ethers are a known class of compounds readily obtained by condensing the appropriate dialdehyde with the desired phenol. Typical tetraphenols useful in the preparation of these epoxy resins are the alpha,alpha,omega,omega - tetrakis(hydroxyphenol) alkanes, such as 1,1,2,2-tetrakis(hydroxyphenol)ethane, 1,1,4,4 - tetrakis(hydroxyphenol)butane, 1,1,4,4 - tetrakis (hydroxyphenol)-2-ethylbutane, and the like. The epoxy resin reaction product of epichlorohydrin and tetraphenol

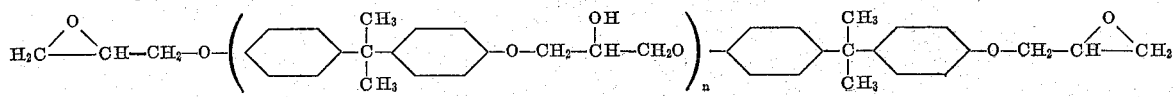

may be represented by the following theoretical structural formula:

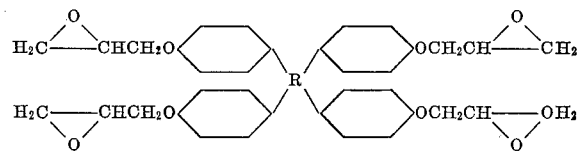

where R is a tetravalent aliphatic hydrocarbon chain having from 2 to 10, and preferably, from 2 to 6, carbon atoms.

Still another group of epoxide materials is the epoxidized novolac resins. Such resins are well-known substances and readily available commercially. The resins may be represented by the following theoretical, idealized formula:

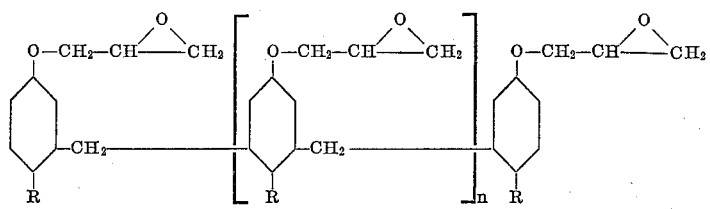

where R is selected from the group consisting of hydrogen and alkyl groups having up to 18 carbon atoms, and $n$ is an integer from 1 to 5. In general, $n$ will be an integer in excess of 1 to about 3.

In general, these resins are obtained by epoxidation of the well-known novolac resins. The novolac resins, as is known in the art, are produced by condensing the phenol with an aldehyde in the presence of an acid catalyst. Although novolac resins from formaldehyde are generally employed, novolac resins from other aldehydes such as, for example, acetaldehyde, chloral, butyraldehyde, furfural, and the like may also be used. The alkyl groups, if present, may have a straight or a branched chain. Illustrative of the alkylphenol from which the novolac resins may be derived are cresol, butylphenol, tertiary butylphenol, tertiary amylphenol, hexylphenol, 2-ethylhexylphenol, nonylphenol, decylphenol, dodecylphenol, and the like. It is generally preferred, but not essential, that the alkyl substituent be linked to the paracarbon atom of the parent phenolic nucleus. However, novolac resins in which the alkyl group is in the ortho position have been prepared.

The epoxidized novolac resin is formed in the well-known manner by adding the novolac resins to the epichlorohydrin and then adding an alkali metal hydroxide to the mixture so as to effect the desired condensation reaction.

In addition, other epoxy resins which may be cured with the curing agents of the present invention are the glycidyl ethers of the polyalkylene glycols, epoxidized olefins such as epoxidized polybutadiene and epoxidized cyclehexenes.

In general, the epoxy resins may be described as those having terminal epoxide groups.

In addition, the epoxy resins may be characterized further by reference to their epoxy equivalent weight, the epoxy equivalent weight of pure epoxy resin being the mean molecular weight of the resins divided by the mean number of epoxy radicals per molecule, or in any case, the number of grams of epoxy resin equivalent to one epoxy group or one gram equivalent of epoxide. The epoxy resinous materials employed in this invention have an epoxy equivalent weight of from about 140 to about 2,000.

The aminohydroxyalkyl amine is used in an amount sufficient to cure the epoxy resin to the desired extent. Generally, said amines are used in ratios by weight curing agent to epoxy resin of from about 10:90 to 60:40 and preferably from about 20:80 to 40:60. It is particularly preferred to use a ratio of 30:70.

Curing can be carried out by mixing the amines and epoxy resins at room temperature. Thus, the cure of the epoxy resin may be obtained at about 20° C., without heating or at higher temperatures, as up to 250° C., care being taken that the temperature used is not so high as to cause charring of the resinous product. The exothermic heat of reaction between the amines and epoxy resins is very low; therefore, large masses of casting may be made without distortion or destruction by cracking or charring. The time for effecting a complete cure can be varied from several minutes to several hours.

The following examples serve to illustrate the present invention without, however, limiting the same thereto:

EXAMPLE I

To 70 parts by weight of an epoxy resin which was the reaction product of Bisphenol A and epichlorohydrin having an epoxy equivalent weight of about 190 and a viscosity of 100 poises at 25° C. were added 30 parts by weight of distilled 9(10)-amino-10(9)-hydroxystearylamine. After blending intimately, the materials were cured at 150° C. for four hours. The resulting casting had the following characteristics:

Barcol hardness _____ 48–50.
Heat distortion temperature 62° C.
Shrinkage, linear, percent __ 1.32.
Tensile strength _____ 9300 p.s.i.
Flexural modulus _____ $3.54 \times 10^5$ p.s.i.
Water absorption _____ 24 hrs., wt. percent, 0.065.
Falling ball impact _____ 9.43 lbs. minimum.

EXAMPLE II

The crude hydroxy amine of Example I (prior to distillation) was reacted with the epoxy resin of Example I in the same ratio. After curing for four hours at 150° C. the casting had the following properties:

Barcol hardness _____ 48–50.
Heat distortion temperature 62° C.
Shrinkage, linear, percent __ 1.72.
Tensile strength _____ 9500 p.s.i.
Flexural modulus _____ $3.26 \times 10^5$ p.s.i.
Water absorption _____ 24 hrs., wt. percent, 0.047.
Falling ball impact _____ 9.43 lbs. minimum.

EXAMPLE III

The residue from the distillation of the hydroxy amine of Example I was reacted with the epoxy resin of Example I in the ratio of 35 parts by weight of the hydroxy amine to 65 parts by weight of the epoxy. Curing was accomplished in four hours at 150° C. after which the casting had the following properties:

Barcol hardness _____ 53–55.
Heat distortion temperature 58° C.
Shrinkage, linear, percent __ 1.75.
Tensile strength _____ 9200 p.s.i.
Flexural modulus _____ $3.02 \times 10^5$ p.s.i.
Water absorption _____ 24 hrs., wt. percent, 0.027.
Falling ball impact _____ 9.43 lbs. minimum.

As can be seen from Examples I and II, castings prepared from the epoxy resin and either the crude or purified hydroxy amine have very similar characteristics. This is advantageous since elaborate purifying procedures are unnecessary to give satisfactory cross linking with epoxy resins. The dark residue of distillation has almost as good properties as the coreactant with the epoxy resin as the crude or purified hydroxy amine (see Example III). This shows the non-sensitivity of the hydroxyl amine to minor amounts of impurities.

EXAMPLE IV

The crude hydroxy amine and the epoxy resin of Example II were reacted in the same ratio as set forth therein. The quantity of reactants totaled 8.7 pounds (one gallon) in mass. The rise in temperature due to exothermic heat of reaction was noted periodically and the point at which the reactants gelled was also noted. The gelation point was reached after thirty minutes starting at a temperature of 25° C. The maximum temperature reached was 201° C. after a period of 80 minutes. The casting thus prepared had a good color and was without cracks, bubbles, or other imperfections. A mechanical part having excellent physical properties was machined from the casting. This example demonstrates the lack of destructive exothermic heat in the reaction and the excellent properties and machinability of the cured epoxy resins.

EXAMPLE V

To 70 parts by weight of the epoxy resin and 30 parts by weight of the hydroxy amine of Example I were added 25 parts by weight of finely divided kaolin clay. After blending thoroughly, the paste-type adhesive was applied to freshly sanded 24 ST aluminum strips which were then cured for 4 hours at 150° C. The strips were cut into one inch widths and tested for tensile shear strength. At room temperature, this adhesive exhibited a tensile shear strength of 2400 p.s.i. At 250° F., it still retained 300 p.s.i. tensile shear strength.

EXAMPLE VI

To a mixture of 60 parts by weight of the diglycidyl ester of dimerized vegetable oil acids having an epoxy equivalent weight of 323 and a percent oxirane oxygen of 3.81 and 20 parts by weight of the epoxy resin of Example I were added 20 parts by weight of distilled 9(10)-amino-10(9)-hydroxystearylamine. The resulting fluid adhesive was applied to can maker's quality (CMQ) cold, rolled steel and cured for four hours at 150° C. The cured adhesive had a Shore A hardness of 65, a cold temperature impact resistance of 3½ inch pounds at −10° C. and a peel strength of 60 pounds.

EXAMPLE VII

To 70 parts by weight of the epoxy resin described in Example I were added 30 parts by weight of 9(10)-(β-aminoethyl)amino-10(9)-hydroxystearylamine. The reactants were blended thoroughly and then cured at 150° C. for four hours. The resulting clear amber casting had the following properties:

Barcol hardness _____ 55–57.
Heat distortion temperature ___ 85° C.
Shrinkage, linear, percent _____ 2.9.
Water absorption _____ 24 hrs., wt. percent, 1.5.
Flexural strength _____ 8120 p.s.i.
Flexural modulus _____ $3.2 \times 10^5$ p.s.i.
Falling ball impact _____ 9.43 lbs. minimum.

EXAMPLE VIII 60 grams of the hydroxy amine of Example VII and 140 grams of the epoxy resin of Example I were blended at 75° F. This mixture, in a concentrated mass reacted to achieve a maximum temperature of 192° C. and gelled in 55 minutes. This demonstrates the relatively long pot life of the approximately ½ pint blended casting compound. Such a pot life of almost one hour is highly desirable since the blended casting compounds can be used over a considerable period of time.

EXAMPLE IX 80 parts by weight of the diglycidyl ester of dimerized vegetable oil acids of Example VI were blended with 20 parts by weight of the hydroxy amine of Example VII. This adhesive was applied to cold, rolled steel (CMQ) and cured for four hours at 150° C. At the end of this time, one inch strips were tested for peel strength and

*Table I*

| Example | Hydroxy Amine | Wt. Ratio Amine/epoxy | Heat Distortion Temperature, ° C. | Barcol Hardness | Flexural Ultimate (p.s.i.) |
|---|---|---|---|---|---|
| X | 9(10)-amino-10(9)-hydroxy-stearylamine. | 20/80 | 50 | 56–59 | |
| XI | ___do___ | 25/75 | 69 | 59–63 | |
| XII | ___do___ | 30/70 | 84 | 58–60 | |
| XIII | ___do___ | 35/65 | 59 | 55–57 | |
| XIV | 9(10)-amino-10(9)-hydroxystearylamine. | 40/60 | 48 | 48–52 | |
| XV [1] | ___do___ | 30/70 | 78 | 58–61 | 12,200 |
| XVI | 9(10)-anilino-10(9)-hydroxystearylamine. | 45/55 | 44 | | |
| XVII | ___do___ | 40/60 | 50 | | 12,650 |
| XVIII | ___do___ | 35/65 | 37 | | |
| XIX | 9(10)-(β-amino-ethyl)amino-10(9)-hydroxy-stearyl amine. | 30/70 | 85 | | |
| XX | ___do___ | 25/75 | 91 | | 14,060 |
| XXI | ___do___ | 20/80 | 72 | | |
| XXII | 9(10)-(m-aminomethyl-benzyl) amino-10(9)-hydroxystearylamine. | 25/75 | 65 | 58–63 | |
| XXIII | ___do___ | 30/70 | 88 | 58–62 | |
| XXIV | ___do___ | 35/65 | 68 | 53–57 | |
| XXV | 9(10)-(gamma-amino-propyl) amino-10(9)-hydroxystearylamine. | 20/80 | 48 | 59–61 | |
| XXVI | ___do___ | 25/75 | 73 | 59–62 | |
| XVXII | ___do___ | 30/70 | 77 | 54–58 | |
| XXVIII | ___do___ | 35/65 | 61 | 50–52 | |
| XXIX [2] | 9(10)-(gamma-amino propyl) amino-10(9)-hydroxy-stearyl-(gamma-aminopropyl) amine. | 25/75 | 73 | 58–61 | |
| XXX | ___do___ | 30/70 | 76 | 54–58 | |
| XXXI | ___do___ | 35/65 | 59 | 49–54 | |

[1] The casting of this example was cured for 4.5 hours instead of 2 hours.
[2] The hydroxy amine of this example was prepared by treating 1 mole of 9(10)-amino-10(9)-hydroxystearylamine with two moles of acrylonitrile followed by catalytic hydrogenation to the desired tetramine.

found to resist 25 lbs. A ⅛ inch casting of this material on the steel had an impact strength in excess of 3½ inch pounds at −10° C. This example again demonstrates the remarkable impact resistance and low modulus which can be obtained using the hydroxy amine curing agent of this invention.

EXAMPLES X–XXXI

Castings were prepared from the epoxy resin described in Example I and various hydroxy amines. Said castings were made by blending the reactants and then heating to 150° C. for two hours. The ratios of the hydroxy amine to the epoxy and the results of the tests are set forth in Table I.

The data of Table I show that a wide variety of hydroxy amines may be reacted with the epoxy resin to form outstanding castings. Also, the weight ratio of amine to epoxy may be varied considerably, the optimum being in most cases 30/70.

EXAMPLES XXXII–XXXVI

Coatings were prepared from various hydroxy amines and an epoxy resin which was the reaction product of Bisphenol A and epicholorohydrin having an epoxy equivalent weight of about 450–525. The hydroxy amines were dissolved in a blend of xylene and Cellosolve in a ratio of 9:1 at 60 percent solids. This solution was then added to a 60 percent solids solution of the epoxy resin dissolved in a blend of xylene and methyl isobutyl ketone in a ratio of 1:1. The volumes of the two solutions were adjusted to give the desired weight percent amines of the total solids in the resulting coatings. The initial viscosity, viscosity at 6 hours, Sward hardness and impact resistance were then measured, the results being set forth in the following Table II.

9(10)-di-(gamma-aminopropyl) amino-10(9)-hydroxystearylamine,
9(10)-dimethylamino-10(9)-hydroxystearylamine,
9(10)-diethanolamino-10(9)-hydroxystearylamine,
9(10)-meta-aminophenylamino-10(9)-hydroxystearylamine.

Likewise, any of a wide variety of epoxy resins may be substituted for those of the examples to provide coatings, laminates, adhesives, castings, and the like when cured with the hydroxy amines.

It is also within the scope of the invention to include in the compositions, solid modifiers (such as pigments, fillers, and treated clays), plasticizers (such as dibutyl phthalate, and the like), solvents, and other well-known addition agents.

It is to be understood that the invention is not to be limited to the exact details of operation or the exact compositions shown or described, as obvious modifications and equivalents will be apparent to those skilled in the art and the invention is to be limited only by the scope of the appended claims.

I claim:

1. A cured composition comprising the reaction product of an epoxy resin having terminal epoxide groups $$-\underset{H}{\overset{}{C}}\overset{O}{\overbrace{\phantom{--}}}\underset{H}{\overset{}{C}}-$$

and an epoxy equivalent weight of from about 140 to 2000 and an aminohydroxyalkyl amine having the formula:

$$R-\left[-\underset{OH}{\overset{}{C}H}-\underset{Z'}{\overset{}{C}H}-\right]-R'-CH_2-Z$$

where R is an alkyl radical of 5 to 17 carbon atoms, R'

*Table II*

| Example | Hydroxy Amine | Wt. Percent Amine in Total Solids | Gardner-Holdt Viscosity | | Sward Hardness | | | Impact Resistance Inch Lbs. | |
|---|---|---|---|---|---|---|---|---|---|
| | | | Within 10 min. | 6 hrs. | Dried | | Baked* | Dried 1 day | Baked* |
| | | | | | 1 day | 7 days | | | |
| XXXII | 9(10)-amino-10(9)-hydroxystearylamine. | 25 | M | Z | 9 | 18 | 45 | 60 | 60 |
| XXXIII | 9(10)-(β-aminoethyl) amino-10(9)-hydroxystearylamine. | 15 | W | Z⁴ | 13 | 21 | 76 | 60 | 60 |
| XXXIV | 9(10)-dodecylamino-10(9)-hydroxystearylamine. | 30 | V | Z | 16 | 29 | 30 | 60 | 60 |
| XXXV | 9(10)-morpholino-10(9)-hydroxystearylamine. | 20 | W | Y | 11 | 21 | 63 | -------- | 60 |
| XXXVI | 9(10)-anilino-10(9)-hydroxystearylamine. | 25 | W | Z⁶† | -------- | -------- | 72 | 60 | -------- |
| XXXVII | 9(10)-morpholino-10(9)-hydroxystearyl morpholine. | 16.6 | H | H | ‡7 | -------- | 46 | -------- | -------- |
| XXXVIII | 9(10)-dimethylamino-10(9)-hydroxydimethyl stearylamine. | 16.6 | N | Z² | ‡38 | -------- | 40 | -------- | 16 |

* Baked for 30 minutes at 300° F.
† This viscosity measurement was obtained at the end of 24 hours.
‡ Sward Hardness measured after drying for 2 days instead of 1 day.

The above data show that the impact resistance of coatings prepared in accordance with the present invention is extremely high and the pot life is favorably long. The coatings also have good resistance to battery acid and aqueous NaOH.

Any of the aminohydroxyalkyl amines falling within the general formula above may be substituted for those in the examples. Representative of such amines are:

9(10)-(gamma-aminopropyl)methylamino-10(9)-hydroxystearylamine,
9(10)-gamma-aminopropyl) anilino-10(9)-hydroxystearylamine,
9(10)-(gamma-aminopropyl) dodecylamino-10(9)-hydroxystearylamine,
9(10)-(gamma-aminopropyl) ethanolamino-10(9)-hydroxystearylamine, is a divalent saturated aliphatic hydrocarbon radical of 5 to 17 carbon atoms, the total number of carbon atoms in R and R' is in the range of 10 to 21, and Z and Z' are selected from the group consisting of

and

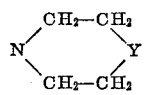

where R" and R'" are members selected from the class consisting of (1) hydrogen, (2) alkyl groups, (3) aryl groups, (4) hydroxyalkyl groups, and (5) aminoalkyl groups and Y is selected from the group of N, O and S, the amount of the aminohydroxyalkyl amine being sufficient to react with said epoxy resin to form a hard, infusible, and insoluble product.

2. A cured composition as defined in claim 1 wherein the epoxy resin is a polyglycidyl ether of a dihydric phenol.

3. A cured composition as defined in claim 1 wherein the aminohydroxyalkyl amine and epoxy resin are reacted in a weight ratio of about 10:90 to 60:40.

4. A cured composition as defined in claim 1 wherein the aminohydroxyalkyl amine is 9(10)-amino-10(9)-hydroxystearylamine.

References Cited by the Examiner

UNITED STATES PATENTS

| | | | |
|---|---|---|---|
| 2,864,775 | 12/1958 | Newey | 260—47 |
| 2,890,228 | 6/1959 | Forster | 260—18 |
| 3,065,247 | 11/1962 | De Groote et al. | 260—348 |
| 3,123,604 | 3/1964 | Rogier | 260—2 |

OTHER REFERENCES

Grant: "Hackh's Chemical Dictionary," third edition (1944), page 310.

WILLIAM H. SHORT, *Primary Examiner.*

JOSEPH R. LIEBERMAN, MILTON STERMAN,
*Examiners.*